United States Patent [19]

Kvasnikoff et al.

[11] Patent Number: 4,980,146

[45] Date of Patent: Dec. 25, 1990

[54] PROCESS FOR REMOVING SULPHUR COMPOUNDS CONTAINED IN A RESIDUAL GAS

[75] Inventors: Georges Kvasnikoff, Monein; Jean Nougayrede, Pau; Andrë Philippe, Orthez, all of France

[73] Assignee: Societe Nationale Elf Aquitaine (Production), Paris, France; A Corporation of France

[21] Appl. No.: 75,749

[22] PCT Filed: Oct. 24, 1986

[86] PCT No.: PCT/FR86/00365

§ 371 Date: Jun. 25, 1987

§ 102(e) Date: Jun. 25, 1987

[87] PCT Pub. No.: WO87/02653

PCT Pub. Date: May 7, 1987

[30] Foreign Application Priority Data

Oct. 25, 1985 [FR] France ................................ 8515906

[51] Int. Cl.$^5$ ............................................ C01B 17/04
[52] U.S. Cl. .................................................. 423/574 R
[58] Field of Search ............. 423/574 R, 576.8, 574 R

[56] References Cited

U.S. PATENT DOCUMENTS

| | | |
|---|---|---|
| 2,889,207 | 6/1959 | Eliot ................................ 423/574 R |
| 3,702,884 | 11/1972 | Hunt, Jr. et al. .................... 423/222 |
| 4,035,474 | 7/1977 | Kunkel et al. .................. 423/574 R |
| 4,054,642 | 10/1977 | Daumas et al. .................. 423/574 R |
| 4,097,585 | 6/1978 | Fischer .......................... 423/574 R |
| 4,123,507 | 10/1978 | Hass ................................ 423/576.8 |
| 4,180,554 | 12/1979 | Goodin, Jr. et al. ............ 423/574 R |
| 4,309,402 | 1/1982 | Al-Muddarris ................. 423/574 R |
| 4,426,369 | 1/1984 | Palm ............................... 423/574 R |
| 4,430,317 | 2/1984 | Reed et al. ..................... 423/574 R |
| 4,436,716 | 3/1984 | Kvasnrkoff et al. ............ 423/574 R |
| 4,462,977 | 7/1984 | Reed ............................... 423/574 R |
| 4,469,803 | 9/1984 | George ............................... 423/576 |
| 4,479,928 | 10/1984 | Voirin .............................. 423/574 R |
| 4,507,275 | 3/1985 | Reed ............................... 423/574 R |
| 4,544,534 | 10/1985 | Dupin et al. ....................... 423/230 |
| 4,552,746 | 10/1985 | Kettner et al. ................. 423/573 G |
| 4,605,546 | 8/1986 | Voirin ............................... 423/576 |

FOREIGN PATENT DOCUMENTS

| | | | |
|---|---|---|---|
| 2538716 | 1/1983 | France .............................. 423/576.8 |
| 1211033 | 1/1968 | United Kingdom ............ 423/574 R |
| 1307716 | 2/1973 | United Kingdom ............ 423/574 R |

Primary Examiner—Jeffrey E. Russel
Attorney, Agent, or Firm—Weiser & Stapler

[57] ABSTRACT

Process for removing sulfur compounds contained in a residual gas with recovery of said compounds in the form of sulfur, wherein a gas obtained from a residual gas containing $H_2S$ and $SO_2$ and having a temperature lower than 160° C. is subjected to a catalytic CLAUS reaction phase with deposition of sulfur on the catalyst and periodic regeneration of the sulfur-laden catalyst and cooling of the regenerated catalyst. The gas brought in contact with the CLAUS catalyst is produced by subjecting the residual gas to a hydrogenation and hydrolysis treatment to provide the sulfur compounds in the unique form of $H_2S$ and to cooling with water separation by condensation and then to catalytic oxidation of $H_2S$ in CLAUS stoichiometry with cooling of the gas stream obtained from the oxidation step under 160° C. in order to separate the sulfur by condensation. Application to the purification of the residual gases emitted by CLAUS sulfur plants.

46 Claims, No Drawings

PROCESS FOR REMOVING SULPHUR COMPOUNDS CONTAINED IN A RESIDUAL GAS

The invention concerns a process for removing sulphur compounds contained in a residual gas and especially those contained in a residual gas issued from a CLAUS sulphur plant, with recovery of the said compounds in the form of sulphur.

The residual gases issued from a sulphur plant in which the sulphur is produced by the process wherein an acid gas containing $H_2S$ is submitted to a partial oxidation known under the name of CLAUS process, contain about 0.2 to 2% in volume of sulphur compounds of which a high proportion consists of $H_2S$, the remainder being constituted by $SO_2$, $CS_2$, COS and vapor and/or vesicular sulphur.

Such residual gases are currently treated to lower as much as possible the overall sulphur compounds content with the purpose of allowing them to be rejected into the atmosphere, after having been incinerated, while respecting the standards imposed by the legislation with respect to atmospheric pollution and simultaneously recovering these sulphur compounds in a form favorable to increasing the content in valorizable products obtained from acid gas treated in a sulphur plant.

One known process developed by the present applicant to carry out the treatment of a residual gas from a CLAUS sulphur plant consists in bringing the residual gas, after possible cooling to a temperature lower than 160° C., into contact with a CLAUS catalyst to form sulphur by reaction of $H_2S$ with $SO_2$, the said catalyst operating at a temperature sufficiently low for the sulphur produced to be retained on the catalyst, and periodically in sweeping the sulphur-laden CLAUS catalyst by means of a non-oxidizing gas having a temperature comprised between 200° C. and 500° C. to vaporize the sulphur retained on the catalyst and thus ensure the regeneration of this latter, then cooling the regenerated catalyst to the temperature required for a fresh contacting with the residual gas, this cooling being carried out by means of an inert gas at a temperature below 160° C., said gas being laden with water vapor at least during the final phase of its utilization.

In order to satisfy the increasingly strict legal standards imposed with respect to atmospheric pollution by sulphur compounds, the applicant has brought to the above-mentioned process the improvement that is the object of the invention and which, on the one hand, ensures good recovery of the organic sulphur compounds present in the residual gas and not recovered by the above-mentioned process and, on the other hand, leads to an improvement of the sulphur yield of the reaction of $H_2S$ with $SO_2$ in contact with the CLAUS catalyst, which increases the overall recovery rate of the sulphur compounds contained in the residual gas and at the same time further lowers the overall concentration of sulphur products vented into the atmosphere.

The aim of the invention is thus an improved process for removing sulphur compounds contained in a residual gas and especially in a residual gas issued from a CLAUS sulphur plant with recovery of the said compounds in the form of sulphur, the said process being of the type in which a gaseous stream issued from the residual gas containing $H_2S$ and $SO_2$ and having a temperature lower than 160° C. is brought, into contact with a CLAUS catalyst to form sulphur by reaction of $H_2S$ with $SO_2$, the said catalyst operating at a sufficiently low temperature for the sulphur produced to be retained on the catalyst, and a purified residual gas having a very low sulphur content is evacuated and periodically the sulphur-laden CLAUS catalyst is swept by means of a non-oxidizing gas having a temperature comprised between 200° C. and 500° C. to vaporize the sulphur retained on the catalyst and thus ensure the regeneration of this catalyst then the regenerated catalyst is cooled to the temperature required for a fresh contacting with the gas containing $H_2S$ and $SO_2$, this cooling being carried out by means of an inert gas having a temperature lower than 160° C., the said cooling gas being preferably laden with water vapor at least during the final phase of its utilization, and characterized in that the gas brought into contact with the CLAUS catalyst is produced by subjecting the residual gas emitted by the sulphur plant to a combined hydrogenation and hydrolysis treatment with the purpose of bringing the sulphur compounds contained therein into the unique form of $H_2S$, then by cooling the gaseous effluent issued from the treatment in such a manner as to bring its water content to a value lower than about 10% by volume and by causing the water-lean gaseous effluent to which has been added a controlled quantity of a free oxygen-containing gas to pass, at a temperature higher than 150° C., into contact with a $H_2S$ oxidation catalyst in order to carry out partial oxidation of $H_2S$ and form a gaseous stream containing $H_2S$ and $SO_2$ in a molar ratio substantially equal to 2:1 as well as elementary sulphur, the said molar ratio being controlled by continuously adjusting the flow-rate of the free oxygen-containing gas added to the water-lean effluent, and by cooling the gaseous effluent resulting from the oxidation in order to bring its temperature to below 160° C. and to separate the greatest proportion of the sulphur contained therein by condensation.

During the combined hydrogenation and hydrolysis phase of the residual gas, which is usually carried out in presence of a catalyst, the sulphur compounds such as $SO_2$, $CS_2$, COS as well as the vapor and/or vesicular sulphur contained therein are transformed into $H_2S$ either under the action of hydrogen, the case of $SO_2$ and of vapor and/or vesicular sulphur, or by hydrolysis, the case of COS and $CS_2$, under the action of the water vapor present in the said residual gas. The combined hydrogenation and hydrolysis treatment in the presence of catalysts is carried out at temperature possibly ranging from about 140° C. to 550° C. and preferably from about 200° C. to 400° C. The hydrogen required for the hydrogenation reaction can already be contained in the residual gas or be formed in situ in the hydrogenation and hydrolysis zone, for example by the reaction of CO with $H_2O$ when the residual gas contains these two reactants, or again added to the residual gas from an external hydrogen source. A practical method of supplying $H_2$ and CO to the residual gas consists in adding to the said residual gas the combustion gases produced by a combustible gas burner operating in sub-stoichiometry. The quantity of hydrogen to be used must be sufficient to obtain a practically complete transformation into $H_2S$ of the compounds or hydrogenable sulphurated products, such as $SO_2$, vapor and/or vesicular sulphur, contained in the residual gas subjected to the hydrogenation and hydrolysis treatment. In practice, the quantity of hydrogen used can be comprised between 1 and 6 times the stoichiometric quantity required to transform into $H_2S$ the hydrogenable sulphur-containing products present in the residual gas.

If the residual gas does not contain enough water vapor for the hydrolysis of the COS and CS$_2$ compounds, it is possible to add thereto the required amount of water vapor prior to carrying out the combined hydrogenation and hydrolysis treatment.

Catalysts that can be used for the hydrogenation and hydrolysis treatment are those which contain compounds of metals belonging to groups Va, VIa and VIII of the Periodic Classification of Elements, for example compounds of metals such as cobalt, molybdenum, chromium, vanadium, thorium, nickel, tungsten, uranium, the said compounds being optionally deposited on a silica or silica/alumina type support. The hydrodesulfuration catalysts based on cobalt and molybdenum oxides deposited on alumina are particularly effective for the hydrogenation and hydrolysis treatment. For this hydrogenation and hydrolysis treatment, the contacting times between the gaseous reaction medium and the catalyst can vary fairly widely. They are advantageously comprised between 1 and 5 seconds, these values being expressed under normal pressure and temperature conditions.

The gaseous effluent resulting from the combined hydrogenation and hydrolysis treatment of the residual gas, is subjected to a cooling, carried out by means of any known technique and, for example, to ar indirect heat exchange with a cooler fluid and/or to a water spraying in order to bring its temperature to a sufficientlY low value to condense the greatest proportion of the water contained therein and supply a water-lean gaseous effluent, that contains less than about 10% water by volume.

The obtained gaseous effluent having a reduced water content is thereafter heated to a temperature compatible with the temperature at which it is desired to carry out the H$_2$S oxidation, this heating being able to be performed especially by indirect heat exchange with the hot gaseous effluent that it is desired to cool in order to separate there from the water through condensation, then is added to the required quantity of the free oxygen-containing gas, this addition being carried out either during the contacting of the said gaseous effluent having a reduced water content with the oxidation catalyst Operating at temperatures higher than 150° C. or preferably prior to the said contacting.

The free oxygen-containing gas used to oxidize H$_2$S in the gaseous effluent is generally air, although it is possible to use pure oxygen, oxygen-enriched air or mixtures, in varied proportions, of an inert gas other than nitrogen with oxygen. The free oxygen-containing gas is used, as mentioned hereinabove, in a controlled quantity so that there is a quantity of oxygen corresponding to that which is exactly necessary to partially oxidize H$_2$S in such a manner as to form a gaseous effluent containing H$_2$S and SO$_2$ in a H$_2$S:SO$_2$ molar ratio equal to about 2:1 as well as a certain quantity of elementary sulphur.

The quantity control of the free oxygen-containing gas is carried out in any manner known per se, for example by determining the value of the H$_2$S:SO$_2$ molar ratio in the gaseous stream resulting from the oxidation and by varying the flow-rate of the gas containing free oxygen used for the oxidation in response to a control value elaborated from the results of these determinations, in such a manner as to maintain the said H$_2$S:SO$_2$ molar ratio at a value 2:1.

The contacting times of the gaseous reaction medium with the oxidation catalyst can be comprised between 0.5 and 10 seconds, these values being given under normal pressure and temperature conditions.

The oxidation catalyst can be selected from among the various catalysts adapted to promote oxidation of H$_2$S by oxygen in CLAUS stoichiometric, i.e. according to the following reaction schema:

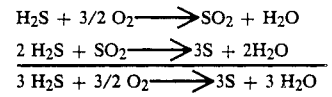

which leads to the production of a gaseous stream containing elementary sulphur as well as H$_2$S and SO$_2$ in a H$_2$S:SO$_2$ molar ratio equal to 2:1.

In particular, the oxidation catalyst used in the process according to the invention can advantageously be selected from among the group comprising:

I. the catalysts resulting from the association of at least one metal compound selected from among Fe, Ni, Co, Cu and Zn with a silica and/or alumina support, which are described in French patent No. 75 31769 (publication No. 2 327 960) of 17.10.1975;

II. the titanium oxide based catalysts and in particular those catalysts resulting from the association of titanium oxide and an alkaline-earth metal sulfate such as calcium sulfate, which are proposed in French patent No. 81 05029 (publication No. 2 501532) of 13.03.1981;

III. the catalysts resulting from the association of at least one compound of a metal selected from among Fe, Cu, Cd, Zn, Cr, Mo, W, Co, Ni and Bi and possibly at least one compound of a noble metal such as Pd, Pt, Ir and Rh with a silica and or titanium oxide support, the said support possibly containing a small proportion of alumina, which are disclosed in French patent No. 81 15900 (publication No. 2 511 663) of 19.08.1981;

IV. the catalysts formed by associating at least one compound of a metal selected from the group mentioned herein-above under (III) with a support consisting of an activated alumina thermally stabilized especially by a small amount of at least ore rare earth oxide, which are described in German patent application published under No. 3 402 328.

Advantageously, the oxidation catalyst can be constituted by using a type II, III or IV catalyst that is followed by a type (I) catalyst, with the advantage that the gaseous stream issued from the oxidation no longer contains oxygen, the aim being to prevent disactivation of the CLAUS catalyst in the subsequent treatment phase.

The H$_2$S oxidation reaction in CLAUS stoichiometry can be carried out at temperatures comprised between 150° C. and 1000° C. and the oxidation catalyst is selected from among those which present sufficient thermal stability at the selected operating temperature. Therefore, type I catalysts can be used up to about 400° C., type (II) catalysts up to about 500° C., type (III) catalysts up to about 700° C. and type (IV) catalysts up to about 1000° C.

The gaseous stream issued from the oxidation contains vaporized sulphur as well as H$_2$S and SO$_2$ in a H$_2$S:SO$_2$ molar ratio equal to about 2:1. This gaseous stream is subjected to cooling, by operating for example in a sulphur type condenser, in order to bring its temperature to a value lower than 160° C. and so that the greatest proportion of sulphur contained therein is separated by condensation, then it is contacted with the CLAUS catalyst operating at a temperature sufficiently low for the sulphur forming by reaction of H₂S on SO₂ to be deposited on the catalyst, the said temperature being advantageously comprised between 120° C. and about 140° C.

The purified residual gas issued from the contacting with the CLAUS catalyst is generally subjected to a thermal or catalytic incineration, in order to transform into SO₂ all the sulphur compounds still contained therein, in very low quantities, prior to being rejected into the atmosphere.

Periodically, the regeneration of the sulphur-laden catalyst is carried out by sweeping the said catalyst with a non-oxidizing gas having a temperature comprised between 200° C. and 500° C. to vaporize the sulphur retained on the catalyst then the regenerated catalyst is cooled to the temperature required for a fresh contacting with the gaseous stream issued from the oxidation, this cooling being performed by means of an inert gas having a temperature lower than 160° C. Advantageously, the cooling gas is laden with water vapor, at least during the final cooling phase of the catalyst.

The sweeping gas used for the regeneration of the sulphur-laden CLAUS catalyst can be such as methane, nitrogen, SO₂ or mixtures of such gases or again consist of a fraction of the purified residual gas directed towards the incineration or of a fraction of the residual gas to be treated. The said sweeping gas can contain a certain proportion, for example 0.5 to 25% in volume, of a gaseous reducing compound such as H₂, CO and in particular H₂S, at least during the final regeneration phase, i.e. after the vaporization of the greatest proportion of the sulphur deposited on the catalyst.

The contacting of the gaseous stream issued from the oxidation with the CLAUS catalyst is generally carried out in a plurality of catalytic conversion zones that operate in such a manner that one at least of the said zones operates in regeneration cooling phase while the other zones are in CLAUS reaction phase. It is again possible to operate with one or several zones in CLAUS reaction phase, at least one zone in regeneration phase and at least one zone in cooling phase.

The CLAUS catalyst can be any one of the catalysts adapted to be used for promoting the formation reaction of sulphur from H₂S with SO₂, i.e. the reaction:

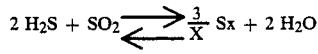

For example, the said CLAUS catalyst can be bauxite, alumina silica, natural or synthetic zeolite, a type (I) catalyst mentioned herein-above or mixtures or associations of such products.

The regeneration gas preferably circulates in closed circuit from a heating zone, passing successively by a zone undergoing regeneration and a cooling zone, in which the greatest proportion of the sulphur contained therein is separated by condensation, and then returns to the heating zone. It is well understood that the regeneration gas can also be circulated in open circuit.

The gas used for the cooling of the regenerated catalyst is of the same type as the one used for the regeneration of the sulphur-laden catalyst, i.e. is a substantially inert gas. The regeneration gas circuits and gas cooling circuits can be independent from each other. The gas regeneration circuit mentioned herein-above can also comprise a derivation connecting the outlet of its cooling zone to the input of the zone undergoing regeneration by by-passing its heating zone, which allows to short-circuit the said heating zone and thus to use the regeneration gas as cooling gas.

As mentioned herein-above, the cooling gas can contain water vapor at least during the final phase of cooling of the regenerated catalyst and more particularly when the temperature of the regenerated catalyst undergoing cooling falls to below about 250° C. However, the cooling gas can contain water vapor as from the beginning of the cooling phase of the regenerated catalyst. The quantity of water vapor that can be contained in the cooling gas can vary fairly widely and can be comprised for example between 1 and 50% in volume.

To complete the foregoing description of the process according to the invention, an example for carrying out the process of the invention will now be given by way of nonlimitative illustration.

EXAMPLE

There was treated a residual gas issued from a sulphur plant in which was carried out the oxidation of an acid gas containing in volume 60.4% of H₂S, 36.3% of CO₂, 3.2% of water and 0.1% of hydrocarbons.

| | |
|---|---|
| H₂S | 0.80 |
| SO₂ | 0.40 |
| S₁ (vapor) | 0.08 |
| CO₂ | 16.65 |
| H₂O | 29.80 |
| N₂ | 49.75 |
| H₂ | 1.93 |
| CO | 0.52 |
| COS | 0.02 |
| CS₂ | 0.05 |

For this treatment, a device comprising the following elements was utilized:

a burner carrying out the combustion of a combustible gas by means of air and presenting an inlet for the residual gas to be treated and an outlet, the said burner functioning in sub-stoichiometry;

a hydrogenation and hydrolysis reactor provided with an inlet and outlet separated by a fixed bed of a hydrogenation and hydrolysis catalyst, the inlet of the said reactor being connected by a pipe to the outlet of the burner;

a cooling assembly comprising in series the first exchange circuit of an indirect heat exchanger, a low pressure vapor-producing heat exchanger, then an air-refrigerated device and finally a water spraying tower provided at the bottom with an outlet for the liquids and at the head with an outlet for the gases, the inlet of the said first exchange circuit being connected by a pipe to the outlet of the hydrogenation and hydrolysis reactor;

a catalytic oxidation reactor provided with an inlet and outlet separated by a fixed bed of a catalyst promoting the oxidation of H₂S into sulphur, the inlet of the said oxidation reactor being connected by an inlet pipe, through the second exchange circuit of the heat exchanger of the cooling assembly at the outlet in head of the water spraying tower while the outlet of the said reactor is extended by a pipe on which is mounted a sulphur condenser, the inlet pipe of the oxidation reactor being provided with an air injection inlet disposed downstream from the heat exchanger and equipped with a variable flow-rate valve controlled by a regulating device adjusting the $H_2S:SO_2$ molar ratio at the outlet of the oxidation reactor, and a catalytic conversion unit formed of two catalytic converters mounted in parallel and each provided with an inlet and an outlet separated by a fixed bed of a CLAUS catalyst, the said converters operating in such a manner that alternately through valves that can be commuted by a clock, one of the converters is in reaction phase, i.e. has its inlet connected to the outlet of the sulphur condenser associated to the catalytic oxidation reactor and its outlet connected to the inlet of an incinerator, while the other converter is in regeneration/-cooling phase, i.e. is placed first of all in a regeneration circuit, comprising means for ensuring the circulation of a non-oxidizing sweeping gas through the said converter from a heating device up to a sulphur condenser and return to the heating device, then in a cooling circuit disposed so as to cause a cold inert gas to circulate through the converter placed in its circuit.

The catalyst used for the combined hydrogenation and hydrolysis treatment was constituted of beads of about 5 mm in diameter of alumina impregnated with cobalt oxide and molybdenum oxide presenting a specific surface of 250 m²/g and containing 1.75% of cobalt and 8% of molybdenum, expressed as weight of the catalyst.

The oxidation catalyst intended for oxidizing $H_2S$ into sulphur consisted of a layer of extruded pellets, of 4 mm in diameter, of titanium oxide stabilized by 10% by weight of calcium sulfate followed by a layer of beads, of 4 to 6 mm in diameter, of an activated alumina impregnated with iron sulfate (5% by weight of iron in the catalyst).

The CLAUS catalyst was formed of beads, of 4 mm to 6 mm in diameter, of an alumina presenting a surface area of 260 m²/g.

The residual gas, injected into the burner with a flow-rate of 223 Kmoles/hour, was brought into the said burner at a temperature of about 350° C. and entered at this temperature into the hydrogenation and hydrolysis reactor. In this reactor, the $SO_2$, $S$, $CS_2$ and COS conversion into $H_2S$ was practically total and the gaseous effluent issued from this reactor had a temperature of about 380° C. and practically contained only $H_2S$ as sulphur compound. This gaseous effluent was cooled to about 80° C., by passage in the heat exchanger then in the vapor-producing exchanger and the air-refrigerated device of the cooling assembly and entered at this temperature into the water spraying tower of the said assembly.

At the head of the said tower issued a cooled gaseous effluent having a temperature of about 35° C. and a water vapor content of about 4.6% in volume.

This cooled effluent was heated in the heat exchanger of the cooling assembly and thereafter was added, by the inlet foreseen for this purpose, 7.61 Kmoles/hour of air and the mixture obtained penetrated into the catalytic oxidation reactor at a temperature of 200° C. The contacting times of the gases passing into the oxidation reactor, on the one hand with the stabilized titanium oxide layer and on the other hand with the alumina impregnated with iron sulfate layer, were respectively of about 3 seconds and 1.5 seconds. The conversion rate of $H_2S$ in the oxidation reactor represented about 72% and the gaseous stream issued from the said reactor had a temperature of about 295° C. and contained $H_2S$ and $SO_2$ in a $H_2S:SO_2$ molar ratio substantially equal to 2:1 and furthermore a certain quantity of elementary sulphur.

The gaseous stream was cooled to 130° C. in the sulphur condenser associated to the oxidation reactor, the greatest proportion of sulphur contained in this gaseous stream thus being separated by condensation, then injected into the catalytic converter operating in CLAUS reaction phase. At the outlet of the said converter a purified residual gas is evacuated at a temperature of about 135° C. and with an overall sulphur content equal to 800 ppm in volume.

The sweeping gas used for the regeneration of the sulphur-laden catalyst contained in the converter in regeneration phase then cooling phase was constituted by a fraction of the purified residual gas and introduced with a flow-rate of 2600 Nm³/h into the converter in regeneration phase after having been brought to a temperature comprised between 300° and 350° C. in the heating device of the regeneration circuit. The sulphur-laden sweeping gas issued from the converter in regeneration phase thereafter passed into the sulphur condenser of the regeneration circuit, in order to be cooled to about 130° C. so as to separate by condensation the greatest proportion of the sulphur contained therein, then returned to the heating device to be used again for the regeneration. When the sweeping gas issued from the converter in regeneration phase contains practically no more sulphur, into the purging gas is injected a certain proportion of the acid gas treated on the sulphur unit, from which has issued the residual gas to be treated, in order to have a $H_2S$ concentration of about 10% in volume in the sweeping gas and the sweeping of the catalyst is further continued by the $H_2S$-laden gas for a period sufficient to ensure reactivation of the said catalyst.

The regenerated catalyst is thereafter cooled to the temperature of about 130° C. by passing into the converter containing it a gas stream at a temperature of about 130° C., constituted by a proportion of the purified residual gas cooled to the appropriate temperature and circulating in the cooling circuit with a flow-rate of 2100 Nm³/h, the water content of the cooling gas being about 5% in volume.

The catalytic converters operated alternately during 30 Hours in scrubbing phase, i.e. in reaction phase, and for 30 hours of which 10 Hours of cooling, in regeneration/cooling phase.

The final regeneration phase in the presence of $H_2S$ lasted 2 Hours.

The sulphur plant using the process mentioned hereinabove for treating its residual gas has an overall sulphur yield of 99.70% over a period of several months.

We claim:

1. A process for removing sulphur-containing compounds from a residual gas issued from a CLAUS sulphur plant with recovery of said compounds in the form of sulphur, which comprises:
    (a) subjecting the residual gas to a combined hydrogenation and hydrolysis treatment to convert the sulphur containing compounds to $H_2S$ to form a gaseous effluent containing $H_2S$ as the substantially sole sulphur compound and water vapor,
    (b) cooling said gaseous effluent to condense the water vapor contained therein to produce water-lean gaseous effluent containing $H_2S$ essentially as the sole sulphur-containing compound and less than 10% by volume water vapor, (c) feeding essentially all of said water-lean gaseous effluent and a controlled and limited quantity of an oxidizing gas containing free oxygen to a $H_2S$ oxidation catalyst and partially oxidizing the $H_2S$ to sulphur and $SO_2$, while operating said catalyst at a temperature higher than about 150° C. to produce a gaseous stream containing elementary sulphur, and $H_2S$ and $SO_2$ in a $H_2S$ to $SO_2$ molar ratio of about 2:1, (d) maintaining said molar ratio by continuously adjusting the flow-rate of the oxidizing gas, (e) cooling the whole gaseous stream which contains elementary sulphur resulting from said partial oxidation to a temperature below 160° C. and concurrently removing from the gaseous stream substantially all the sulphur contained therein by condensation, (f) feeding essentially all of the cooled gaseous stream substantially free of sulphur to a CLAUS catalyst in a converter and contacting the cooled gaseous stream from step (e) with a CLAUS catalyst to deposit sulphur formed by reaction of $H_2S$ with $SO_2$ on the catalyst, said catalyst operating at a sufficiently low temperature between about 120° C. and 140° C. to retain the sulphur produced, and to obtain a purified residual gas substantially free from sulphur compounds, (g) exhausting the purified gas, (h) periodically sweeping the sulphur-laden CLAUS catalyst with a non-oxidizing gas mixed with the purified residual gas substantially free of sulphur compounds wherein essentially all of the mixture sweeps the CLAUS catalyst at a temperature between about 200° C. and 500° C. to vaporize the sulphur retained on the catalyst and regenerate said catalyst and, (i) cooling the regenerated catalyst to the catalyst operating temperature of step (f) with an inert gas having a temperature less than about 150° C.

2. Process according to claim 1, wherein the combined hydrogenation and hydrolysis treatment in step (a) is carried out at a temperature between about 140° C. and 550° C.

3. The process of claim 1, wherein the $H_2S$ oxidation catalyst comprises at least one compound of a metal selected from the group consisting of Fe, Ni, Co, Cu, and Zn in contact with a support consisting of at least one member selected from the group consisting of alumina and silica.

4. Process according to claim 1, wherein the $H_2S$ oxidation catalyst is titanium oxide based.

5. The process of claim 1, wherein the $H_2S$ oxidation catalyst comprises at least one compound of a metal selected from the groups consisting of Fe, Cu, Cd, Zn, Cr, Mo, W, Co, Ni and Bi in contact with a support consisting of at least one member selected from the group consisting of silica and titanium oxide.

6. The process of claim 1, wherein the $H_2S$ oxidation catalyst comprises at least one compound selected from the group consisting of Fe, Cu, Cd, Zn, Cr, Mo, W, Co, Ni, and Bi in contact with a support consisting of active alumina thermally stablized.

7. Process according to claim 3, wherein the $H_2S$ oxidation temperature on the oxidation catalyst is between about 150° C. and 400° C.

8. Process according to claim 4, wherein the $H_2S$ oxidation temperature on the oxidation catalyst is between about 150° C. and 500° C.

9. Process according to claim 5, wherein the $H_2S$ oxidation temperature on the oxidation catalyst is between about 150° C. and 700° C.

10. Process according to claim 6, wherein the $H_2S$ oxidation temperature on the oxidation catalyst is between about 150° C. and 1000° C.

11. Process according to claim 1, wherein the non-oxidizing sweeping gas for the catalyst regeneration in step (h) includes a reducing compound comprising $H_2$, CO or $H_2S$ at least after the vaporization of substantially all the sulphur deposited on the catalyst.

12. Process according to claim 11, wherein the concentration of the reducing compound in the non-oxidizing sweeping gas is from about 0.5 to 25% by volume.

13. Process according to claim 1, wherein the inert gas for cooling the regenerated CLAUS catalyst in step (i) contains water vapor at least during a final cooling phase of the catalyst.

14. Process according to claim 13, wherein the water vapor content of the inert gas is beetween about 1 and 50% by volume.

15. The process of claim 1, wherein the CLAUS catalyst comprises at least one member selected from the group consisting of alumina, bauxite, silica, and zeolite, and a material consisting of at least one compound of a metal selected from the group consisting of Fe, Ni, Co, Cu, and Zn in contact with a support comprising a material selected from the group consisting of silica and alumina.

16. The process according to claim 4, wherein the $H_2S$ oxidation catalyst comprises a second catalyst surface layer made of a material consisting of at least one compound of a metal selected from the group consisting of Fe, Ni, Co, Cu and Zn in contact with a support consisting of at least one member selected from the group consisting of alumina and silica.

17. The process according to claim 5, wherein the $H_2S$ oxidation catalyst comprises a second catalyst surface layer made of a material consisting of at least one compound of a metal selected from the group consisting of Fe, Ni, Co, Cu and Zn in contact with a support consisting of at least one member selected from the group consisting of alumina and silica.

18. The process according to claim 6, wherein the $H_2S$ oxidation catalyst comprises a second catalyst surface layer made of a material consisting of at least one compound of a metal selected from the group consisting of Fe, Ni, Co, Cu and Zn in contact with a support consisting of at least one member selected from the group consisting of alumina and silica.

19. The process according to claim 16, wherein the $H_2S$ oxidation temperature on the oxidation catalyst is between about 150° C. and about 400° C.

20. Process according to claim 17, wherein the $H_2S$ oxidation temperature on the catalyst is between about 150° C. and about 400° C.

21. Process according to claim 18, wherein the $H_2S$ oxidation temperature on the catalyst is between about 150° C. and about 400° C.

22. The process according to claim 1, wherein the combined hydrogenation and hydrolysis treatment is carried out at a temperature between about 200° C. and 400° C.

23. The process according to claim 4, wherein the $H_2S$ oxidation catalyst comprises titanium oxide with an alkaline-earth metal sulfate.

24. The process according to claim 4, wherein the H₂S oxidation catalyst comprises titanium oxide with calcium sulfate.

25. The process according to claim 5, wherein the supported H₂S oxidation catalyst further comprises Pd, Pt, Ir or Rh.

26. The process according to claim 6, wherein the H₂S oxidation catalyst further comprises Pd, Pt, Ir or Rh.

27. The process according to claim 26, wherein the active alumina support is stabilized by at least one rare earth oxide.

28. The process according to claim 23, wherein the H₂S oxidation catalyst includes a second catalyst surface layer comprising a material of at least one compound of a metal selected from the group consisting of Fe, Ni, Co, Cu and Zn in contact with a support consisting of at least one member selected from the group consisting of alumina and silica.

29. The process according to claim 24, wherein the H₂S oxidation catalyst includes a second catalyst surface layer comprising a material of at least one compound of a metal selected from the group consisting of Fe, Ni, Co, Cu and Zn in contact with a support consisting of at least one member selected from the group consisting of alumina and silica.

30. The process according to claim 25, wherein the H₂S oxidation catalyst includes a second catalyst surface layer comprising a material of at least one compound of a metal selected from the group consisting of Fe, Ni, Co, Cu and Zn in contact with a support consisting of at least one member selected from the group consisting of alumina and silica.

31. The process according to claim 26, wherein the H₂S oxidation catalyst includes a second catalyst surface layer comprising a material of at least one compound of a metal selected from the group consisting of Fe, Ni, Co, Cu and Zn in contact with a support consisting of at least one member selected from the group consisting of alumina and silica.

32. The process according to claim 27, wherein the H₂S oxidation catalyst includes a second catalyst surface layer comprising a material of at least one compound of a metal selected from the group consisting of Fe, Ni, Co, Cu and Zn in contact with a support consisting of at least member selected from the group consisting of alumina and silica.

33. The process according to claim 28, wherein the H₂S oxidation temperature on the oxidation catalyst is between about 150° C. and about 400° C.

34. The process according to claim 29, wherein the H₂S oxidation temperature on the oxidation catalyst is between about 150° C. and about 400° C.

35. The process according to claim 30, wherein the H₂S oxidation temperature on the oxidation catalyst is between about 150° C. and about 400° C.

36. The process according to claim 31, wherein the H₂S oxidation temperature on the oxidation catalyst is between about 150° C. and about 400° C.

37. The process according to claim 32, wherein the H₂S oxidation temperature on the oxidation catalyst is between about 150° C. and about 400° C.

38. The process of claim 1, wherein the purified gas which is exhausted is a fraction and the other fraction is used for regeneration and cooling.

39. The process of claim 1 wherein the regenerated catalyst is cooled with the inert gas containing a fraction of residual gas to be treated.

40. The process of claim 1 wherein the inert cooling gas is selected from the group consisting of nitrogen and methane.

41. A process for removing sulphur-containing compounds from a residual gas issued from a CLAUS sulphur plant with recovery of said compounds in the form of sulphur, which comprises:
  (a) subjecting the residual gas to a combined hydrogenation and hydrolysis treatment to convert the sulphur containing compounds to H₂S to form a gaseous effluent containing H₂S as the substantially sole sulphur compound and water vapor,
  (b) cooling said gaseous effluent to condense the water vapor contained therein to produce water-lean gaseous effluent containing H₂S essentially as the sole sulphur-containing compound and less than 10% by volume water vapor,
  (c) feeding essentially all of said water-lean gaseous effluent and a controlled and limited quantity of an oxidizing gas containing free oxygen to a H₂S oxidation catalyst and partially oxidizing the H₂S to sulphur and SO₂, while operating said catalyst at a temperature higher than about 150° C. to produce a gaseous stream containing elementary sulphur, and H₂S and SO₂ in a H₂S to SO₂ molar ratio of about 2:1,
  (d) maintaining said molar ratio by continuously adjusting the flow-rate of the oxidizing gas,
  (e) cooling the whole gaseous stream which contains elementary sulphur resulting from said partial oxidation to a temperature below 160° C. and concurrently removing from the gaseous stream substantially all the sulphur contained therein by condensation,
  (f) feeding essentially all of the cooled gaseous stream substantially free of sulphur to a CLAUS catalyst in a converter and contacting the cooled gaseous stream from step (e) with a CLAUS catalyst to deposit sulphur formed by reaction of H₂S with SO₂ on the catalyst, said catalyst operating at a sufficiently low temperature between about 120° C. and 140° C. to retain the sulphur produced, and to obtain a purified residual gas substantially free from sulphur compounds,
  (g) exhausting the purified gas,
  (h) periodically sweeping the sulphur-laden CLAUS catalyst with a non-oxidizing gas at a temperature between about 200° C. and 500° C. to vaporize the sulphur retained on the catalyst and regenerate said catalyst and,
  (i) cooling the regenerated catalyst to the catalyst operating temperature of step (f) with an inert gas mixed with the purified residual gas substantially free of sulphur compounds having a temperature less than about 150° C.

42. The process of claim 41 wherein the non-oxidizing sweeping gas contains a fraction of residual gas to be treated.

43. The process of claim 41 wherein the non-oxidizing sweeping gas is selected from the group consisting of nitrogen and methane.

44. A process for removing sulphur-containing compounds from a residual gas issued from a CLAUS sulphur plant with recovery of said compounds in the form of sulphur, which comprises:
  (a) subjecting the residual gas to a combined hydrogenation and hydrolysis treatment to convert the sulphur containing compounds to H₂S to form a gaseous effluent containing H$_2$S as the substantially sole sulphur compound and water vapor, (b) cooling said gaseous effluent to condense the water vapor contained therein to produce water-lean gaseous effluent containing H$_2$S essentially as the sole sulphur-containing compound and less than 10% by volume water vapor, (c) feeding essentially all of said water-lean gaseous effluent and a controlled and limited quantity of an oxidizing gas containing free oxygen to a H$_2$S oxidation catalyst and partially oxidizing the H$_2$S to sulphur and SO$_2$, while operating said catalyst at a temperature higher than about 150° C. to produce a gaseous stream containing elementary sulphur, and H$_2$S and SO$_2$ in a H$_2$S to SO$_2$ molar ratio of about 2:1, (d) maintaining said molar ratio by continuously adjusting the flow-rate of the oxidizing gas, (e) cooling the whole gaseous stream which contains elementary sulphur resulting from said partial oxidation to a temperature below 160° C. and concurrently removing from the gaseous stream substantially all the sulphur contained therein by condensation, (f) feeding essentially all of the cooled gaseous stream substantially free of sulphur to a CLAUS catalyst in a converter and contacting the cooled gaseous stream from step (e) with a CLAUS catalyst to deposit sulphur formed by reaction of H$_2$S with SO$_2$ on the catalyst, said catalyst operating at a sufficiently low temperature between about 120° C. and 140° C. to retain the sulphur produced, and to obtain a purified residual gas substantially free from sulphur compounds, (g) exhausting the purified gas, (h) periodically sweeping the sulphur-laden CLAUS catalyst with a non-oxidizing gas mixed with the purified residual gas substantially free of sulphur compounds wherein essentially all of the mixture sweeps the CLAUS catalyst at a temperature between about 200° C. and 500° C. to vaporize the sulphur retained on the catalyst and regenerate said catalyst and, (i) cooling the regenerated catalyst to the catalyst operating temperature of step (f) with an inert gas which is a separate gas from the sweeping gas which regenerates the CLAUS catalyst, the inert gas having a temperature less than about 150° C.

45. A process for removing sulphur-containing compounds from a residual gas issued from a CLAUS sulphur plant with recovery of said compounds in the form of sulphur, in which two alternating first and second CLAUS converters are used wherein while CLAUS conversion takes place in one converter regeneration and cooling occurs in the other converter, which comprises:

(a) subjecting the residual gas to a combined hydrogenation and hydrolysis treatment to convert the sulphur containing compounds to H$_2$S to form a gaseous effluent containing H$_2$S as the substantially sole sulphur compound and water vapor, (b) cooling said gaseous effluent to condense the water vapor contained therein to produce water-lean gaseous effluent containing H$_2$S essentially as the sole sulphur-containing compound and less than 10% by volume water vapor, (c) feeding essentially all of said water-lean gaseous effluent and a controlled and limited quantity of an oxidizing gas containing free oxygen to a H$_2$S oxidation catalyst and partially oxidizing the H$_2$S to sulphur and SO$_2$, while operating said catalyst at a temperature higher than about 150° C. to produce a gaseous stream containing elementary sulphur, and H$_2$S and SO$_2$ in a H$_2$S to SO$_2$ molar ratio of about 2:1, (d) maintaining said molar ratio by continuously adjusting the flow-rate of the oxidizing gas, (e) cooling the whole gaseous stream which contains elementary sulphur resulting from said partial oxidation to a temperature below 160° C. and concurrently removing from the gaseous stream substantially all the sulphur contained therein by condensation, (f) feeding essentially all of the cooled gaseous stream substantially free of sulphur to a CLAUS catalyst in the first CLAUS converter and contacting the cooled gaseous stream from step (e) with a CLAUS catalyst to deposit sulphur formed by reaction of H$_2$S with SO$_2$ on the catalyst, said catalyst operating at a sufficiently low temperature between about 120° C. and 140° C. to retain the sulphur produced, and to obtain a purified residual gas substantially free from sulphur compounds, (g) exhausting the purified gas, (h) periodically sweeping the sulphur-laden CLAUS catalyst with a non-oxidizing gas at a temperature between about 200° C. and 500° C. to vaporize the sulphur retained on the catalyst and regenerate said catalyst, (i) cooling the regenerated catalyst to the catalyst operating temperature of step (f) with the same gas which is used to regenerate the CLAUS catalyst having a temperature less than about 150° C. and wherein the alternating first and second CLAUS converters in which CLAUS conversion takes place in one converter and regeneration and cooling in the other converter occurs downstream of the partial oxidation of the hydrogen sulfide of step (c) and wherein the gas used to regenerate and cool the CLAUS catalyst is a mixture of non-oxidizing gas and purified residual gas substantially free of sulphur compounds.

46. The process of claim 45, wherein the non-oxidizing gas is selected from the group consisting of nitrogen and methane.

* * * * *